Feb. 28, 1967  R. S. JONES  3,306,388
GROUND EFFECT VEHICLES WITH INDEPENDENT
FLEXIBLE STERN SKIRT SECTION
Filed Aug. 12, 1964  3 Sheets-Sheet 1

United States Patent Office 3,306,388
Patented Feb. 28, 1967

3,306,388
GROUND EFFECT VEHICLES WITH INDEPENDENT FLEXIBLE STERN SKIRT SECTION
Richard Stanton Jones, Cowes, Isle of Wight, England, assignor to Westland Aircraft Limited, Yeovil, England
Filed Aug. 12, 1964, Ser. No. 389,079
Claims priority, application Great Britain, Aug. 23, 1963, 33,428/63
5 Claims. (Cl. 180—7)

This invention relates to a development in the use of flexible underportions for ground effect vehicles, such as skirting around the periphery of the vehicle, and is particularly concerned with such skirting when it is used to enclose the stern portions.

In ground effect vehicles equipped with flexible skirting enclosing the pressurised ground effect cushion, especially if such skirting extends the jet system beneath the solid structure and has a double wall, there is a marked resistance by the skirting at the rear of the vehicle to flex rearwardly upon impact with wave or object as the vehicle moves forward. This is because that portion of the skirting surrounding the stern acts like a scoop when the vehicle is moving forward over ground or water. The rear or stern skirting is, therefore, more prone to damage, particularly during high speed operation. Whilst it is essential for the skirting to remain downwardly suspended, in order to retard the escape of the gaseous cushion, and a degree of rigidity which prevents unwanted outward flexing under the action of the cushion pressure must be inbuilt, nevertheless, it must also be able to flex rearwardly momentarily, when obstacles are struck.

In the past it has been proposed that the portion of flexible skirting surrounding the rear or stern of a ground effect vehicle be provided with a generally vertical split substantially on the longitudinal centre line of the vehicle, so that the individual mating parts of the skirting are able to flex rearwardly, in spite of scooplike action which takes place when obstacles are struck during forward motion, but which assumes its original disposition when the obstacles have been cleared, the individual parts returning to the original disposition under the influence of elastic cords, ballast weights or inherent shaping of the skirting.

Although such an arrangement overcomes the problems involved and operates satisfactorily, I have found that the introduction of the present invention is a simpler and more effective means of achieving the same objects.

Accordingly, this invention relates to a ground effect vehicle provided with a flexible skirting system depending downwardly from the base of the vehicle around all or part of the periphery of the vehicle, and through which air or gas under pressure is discharged downwardly and inwardly, to build up, maintain, and/or vary the air or gas pressure of the ground effect gaseous cushion or cushions or portions thereof, the system forming also a flexible barrier or barriers to the dissipation of pressurised air or gas constituting the ground effect air or gas cushion or cushions or portions thereof associated with the barriers, characterised in that the portion of the flexible skirting system surrounding the rear or stern of the ground effect vehicle comprises a plurality of independent flexible sections co-operating with each other and/or with longitudinal stability keel means, whereby the stiffness of the flexible skirting system is reduced locally.

These arrangements all apply whether the skirting is formed by a composite structure, so as to include pressure air jet orifices as an integral part, form flexible extensions to the air or gas ducts, or form a simple skirting, as dependent upon the type of vehicle to which the development is applied.

Further objects and advantages of the invention will become apparent from the following detailed description, with reference to the accompanying drawings, wherein.

In carrying the invention into effect according to one convenient form by way of example only, I provide a ground effect vehicle generally indicated at 1, with a peripheral flexible skirting system generally indicated at 2, through which air or gas is discharged downwardly in order to generate and maintain the gaseous cushion or cushions upon which the ground effect vehicle 1 is supported. The portion of the peripheral flexible skirting system 2 surrounding the rear or stern of the ground effect vehicle 1 comprises a plurality of independent flexible sections 3 which form at least part of a barrier to the escape of the gaseous cushion or cushions. The adjacent independent flexible sections 3 are not interconnected, and accordingly the stiffness of the peripheral flexible skirting system 2 is reduced locally, and each independent flexible section 3 may flex rearwardly to allow the escape of water entrapped as a result of the scooplike action, or alternatively to allow the vehicle 1 to pass over rigid or semi-rigid obstacles without damage to the peripheral flexible skirting system 2.

Figure 1:
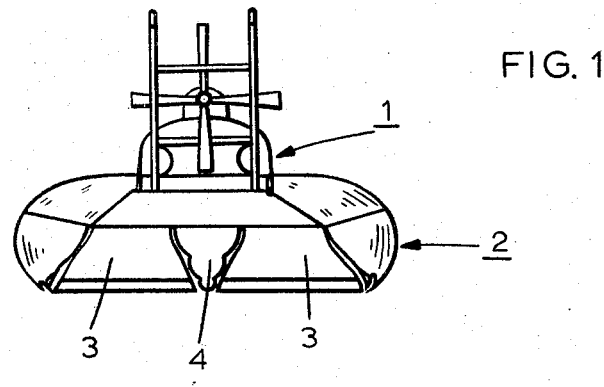
FIGURE 1 is a view of the stern of a ground effect vehicle provided with a flexible skirting system according to the invention.
Figure 2:
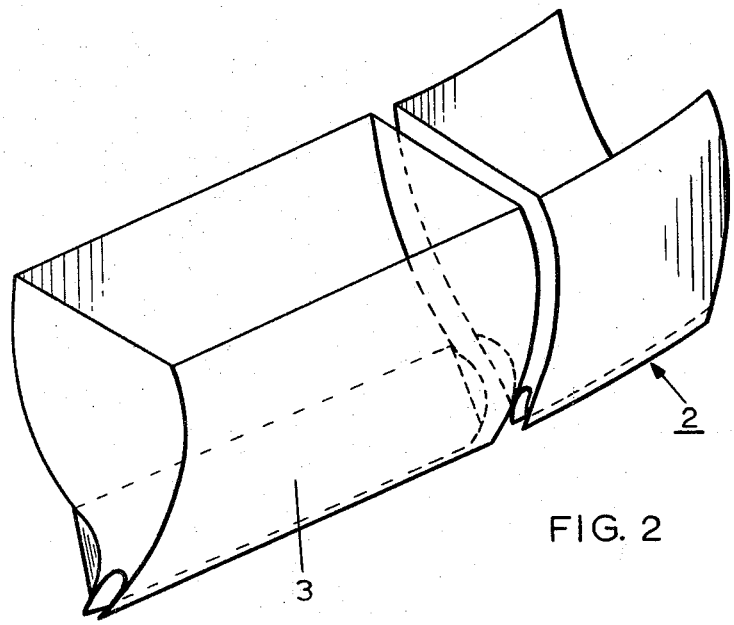
FIGURE 2 is a view on a larger scale than FIGURE 1, from the starboard stern quarter, showing an alternative form of flexible skirting system according to the invention.
Figure 3:
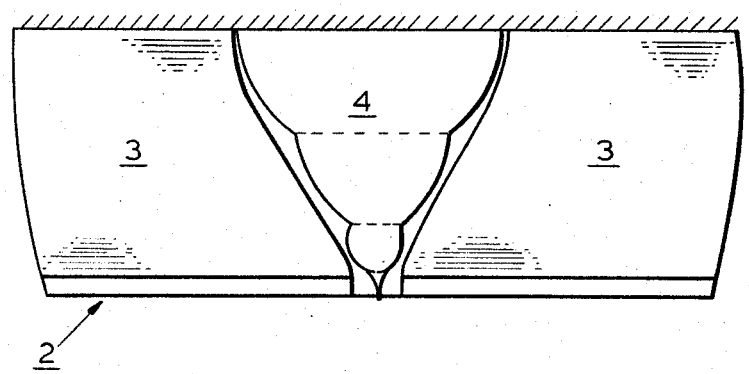
FIGURE 3 is a view from astern of the flexible skirting system shown in FIGURE 2.

In the preferred embodiment one such independent flexible section 3 constucted in cross-section substantially as described in my co-pending application No. 379,847, is provided on either side of a longitudinal keel 4. The longitudinal keel 4 is constructed in accordance with my co-pending application No. 382,866, and extends substantially to the outermost stern quarter of the ground effect vehicle 1. The ends of the independent flexible sections 3 are shaped to suit the profile of, and to co-operate with the longitudinal keel 4, in such a manner that substantially the smallest gap remains between the end of the independent flexible section 3 and the longitudinal keel 4. According to the preferred planform arrangement of the ground effect vehicle 1, the end of each independent flexible section 3, remote from the longitudinal keel 4, is adapted to co-operate with the adjacent portion of the peripheral flexible skirting system 2 in either an end-to-end relationship, as shown in FIGURE 2, or alternatively flush with the inner wall of the peripheral flexible skirting system 2, as shown in FIGURE 1.

When a ground effect vehicle 1 is provided with a flexible skirting system 2, as described in the preferred embodiment, the curtain of air or gas, formed by the air or gas which is discharged downwardly through the flexible skirting system 2, does not entirely encompass the gaseous cushion or cushions upon which the ground effect vehicle 1 is supported. Such a curtain of air or gas is not provided in the region of the stern end of the longitudinal keel 4, since no air or gas is discharged downwardly through the keel 4, and it has been proposed for one specific example that such a break in the continuous curtain of air or gas around the periphery of a ground effect vehicle 1 should be of the order of approximately 6% of the periphery of the ground effect vehicle 1.

In operation of the ground effect vehicle according to the present invention, a certain efflux or air or gas from the gaseous cushion to atmosphere will occur through the break in the continuous curtain of air or gas around the periphery of the ground effect vehicle 1, thereby providing a component of forward thrust to the vehicle. It has been discovered as a result of extensive research and experimentation that such an arrangement is desirable, to allow the escape of entrapped water, and thereby avoid splitting of the stern portions of the peripheral flexible skirting system 2.

It will be appreciated by those skilled in the art, that the actual dimensions of the gap between the independent flexible sections 3 and the longitudinal keel 4 will depend upon the actual cross-section of the longitudinal keel 4. It has been proposed that various forms of additional closure members attached to the longitudinal keel 4, may be provided, in order to minimise the gap between the longitudinal keel 4 and each independent flexible section 3, should that gap be undesirably large.

Figure 4:
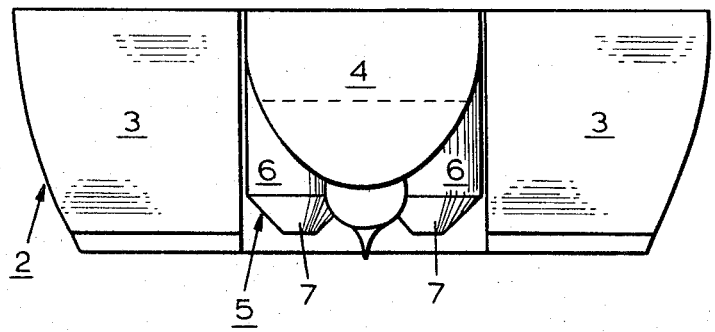
FIGURE 4 is a view from astern of a further form of construction of a flexible skirting system according to the invention.
Figure 5:
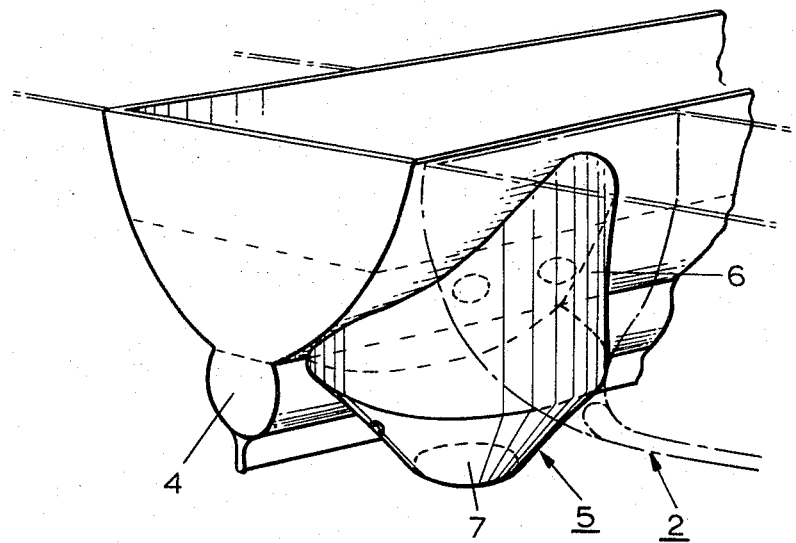
FIGURE 5 is a view from the starboard stern quarter of the flexible skirting system shown in FIGURE 4, to a larger scale.

One such closure member may comprise an inflatable structure generally indicated at 5 in FIGURES 4 and 5. The inflatable structure 5 comprises a partially cylindrical portion 6 depending from the side of the longitudinal keel 4 and a frusto conical portion 7 subtended from the base of the partially cylindrical portion 6.

It will be apparent to those skilled in the art that various other refinements and modifications may be carried into effect without departing from the scope of the invention as defined in the appended claims, e.g. a suitable closure member, such as has hereinbefore been described, may be attached to the inner wall of the peripheral flexible skirting system 2, shown in FIGURE 1, so as to reduce the size of the gap that exists between the independent flexible section 3 and the adjacent inner wall of the peripheral flexible skirting system 2.

It will be further appreciated that it is not an essential feature of the invention that air or gas is discharged downwardly through the independent flexible sections, and that these sections could be constructed at least in part in a similar manner to the longitudinal keel.

I claim as my invention:

1. A ground effect vehicle comprising, in combination, a base, a keel extending longitudinally of the base substantially to the stern thereof, flexible depending skirt means having portions extending along the sides of the base and terminating adjacent the stern of the base at points spaced laterally from the terminal end of said keel, a plurality of independent flexible inflatable skirt sections freely suspended from the base and disposed between the terminal end of the keel and the terminal ends of said skirt portions, said independent skirt sections being movable independently of the adjacent skirt portions and the keel and being inflatable independently of the adjacent skirt portions, the lateral ends of the independent skirt sections being shaped to conform to the adjacent faces of the longitudinal keel and adjacent skirt portions, whereby to provide a flexible understructure system of reduced stiffness at and adjacent the stern of the vehicle.

2. A ground effect vehicle according to claim 1, wherein the independent flexible skirt sections and adjacent portions of the flexible depending skirt means are disposed in end to end relationship.

3. A ground effect vehicle according to claim 1, wherein the ends of the independent flexible skirt sections cooperate with inner walls of said portions of said flexible depending skirt means.

4. A ground effect vehicle according to claim 1, wherein the independent flexible skirt sections extend substantially perpendicular to the longitudinal keel and adjacent portions of the flexible depending skirt means.

5. A ground effect vehicle according to claim 1, wherein a gap exists between the longitudinal keel and the adjacent independent flexible skirt sections, and said longitudinal keel including additional closure members attached to the sides of the longitudinal keel extending within the gap.

References Cited by the Examiner

UNITED STATES PATENTS

| | | | |
|---|---|---|---|
| 3,027,860 | 4/1962 | Priest | 180—7 X |
| 3,141,436 | 7/1964 | Cathers et al. | 180—7 X |
| 3,146,752 | 9/1964 | Ford | 180—7 X |
| 3,191,705 | 6/1965 | Jones et al. | 180—7 |
| 3,252,536 | 5/1966 | Jones | 180—7 |

A. HARRY LEVY, *Primary Examiner.*

BENJAMIN HERSH, *Examiner.*

M. S. SALES, *Assistant Examiner.*